United States Patent Office 3,499,449
Patented Mar. 10, 1970

3,499,449
RESORBABLE SURGICAL SUTURES FROM CELLULOSE ACID ETHERS
David F. Smith, 120 Grove St., Bay Head, N.J. 08742
No Drawing. Filed Sept. 29, 1964, Ser. No. 400,209
Int. Cl. A61l *17/00*
U.S. Cl. 128—335.5   20 Claims

ABSTRACT OF THE DISCLOSURE

This invention discloses products suitable for use as resorbable surgical sutures, and methods for making them from certain cellulose acid ethers—such methods comprising orientation, stretching and drying procedures including special methods of orienting molecular chains through the action on their polar groups of diffusion- and/or membrane-potentials.

---

Presently available resorbable surgical sutures are made by largely subjective mechanical methods from sheep intestines. Such material (called "catgut" or "surgical gut") is variable in its resorption characteristics, in tissue reaction, diameter and strength. Control of quality and uniformity is unsatisfactory due to variations along a single strand and from strand to strand, dependent upon uncontrollable variations in manufacturing and even upon age and condition of the animal source. The necessary statistical quality control is cumbersome and leads to much rejected material. Since many surgeons wish to have buried sutures resorb in the tissues in order to eventually leave no foreign body therein, it is highly desirable to make available a more satisfactory material; but so far efforts in this direction have not succeeded in producing a good substitute.

The present invention resides in the discovery that certain cellulose acid ether compounds can be made relatively insoluble in animal tissue fluids so that they maintain adequate strength in the tissues for several days or weeks until the wound heals but still slowly resorb without undue tissue reaction and finally resorb leaving no undesirable foreign body. Such material can be made uniform in physical and physiological properties and a large batch of material is sufficiently uniform so that a few samples can be taken as representative of the whole batch.

A satisfactory resorbable suture should further have a tensile strength comparable to that of catgut in that it should not be irritating, allergenic or toxic. A surgeon's knot of it should not slip and it should not be stretchable (like a rubber band) since continuing tension on the tissues causes trauma and necrosis.

The cellulose acid ethers of the present invention include cellulose glycolic acid ether, cellulose hydroxy propionic acid ether, hydroxy ethyl cellulose glycolic acid ether and cellulose glycollic acid ether and cellulose hydroxy propionic acid ether wherein up to one-half of the remaining hydroxyl groups of the anhydroglucose units from the cellulose are substituted by methoxy, ethoxy or propoxy groups, which are herein called "lower alkoxy" groups. These acid ethers should be sharply distinguished from their metal salts (such as sodium cellulose glycolic acid ether, sometimes called carboxymethyl cellulose or "CMC") which do not have the properties required herein. These acid ethers can be made from their water-soluble salts by several methods including acidifying the aqueous alcohol solution of the sodium salt and washing with aqueous alcohol in which the acid ether is not soluble, or dialyzing the acidified solution of the salt. In order to conveniently obtain a water solution of the acid ether, one can contact an aqueous solution of the salt with a cation exchange resin in the acid form whereby the sodium ion of the salt is replaced by the hydrogen ion of the exchanger, leaving an aqueous solution of the acid ether. Another method that is highly advantageous for the present purposes is to precipitate an insoluble salt of the acid ether, for example, by infusing a solution of cadmium or copper nitrate into a solution of CMC and then treating the insoluble cadmium or copper salt with dilute aqueous HCl or other strong acid containing sufficient ethyl or isopropyl alcohol to insolubilize the cellulose glycollic acid ether formed as the hydrogen ion from the HCl replace the cadmium or copper ions in the insoluble salt. Other insoluble salts can be formed, preferably those containing polyvalent metal cations and, if such salts are not sufficiently insoluble in water, ethyl or isopropyl alcohol may be added to the solution of CMC in amount insufficient to precipitate the CMC but sufficient to markedly decrease the solubility of the polyvalent metal salt and the precipitated salt is then treated with aqueous HCl containing sufficient alcohol to prevent solution of the salt and of the cellulose acid ether so formed.

There are, for example, many cellulose glycolic acid ethers differing by the chain length of the polymer (number of anhydroglucose units or substituted units from the cellulose chain) and by the number of hydroxyl groups of the anhydroglucose units from the cellulose that have been replaced by acid groups. The chain length (DP) can in general be from 1 to several thousand and the number of hydroxyl groups replaced on a single anhydroglucose unit (DS) can be from 0 to 3. (For details of the structure and chemistry of cellulose and its derivatives, see "Cellulose and Cellulose Derivatives" by Emil Ott, Interscience Publishers, Inc., New York, N.Y., 1942.) Some of the units in a single chain can have their hydroxyl groups replaced and others in the same chain not, so that by DS is meant the average replacement per unit, which can thus be from a small fraction up to a maximum of 3. The DP can be judged from the viscosity of an aqueous solution of the sodium salts of the acid ethers, while the DS can be determined either by titration of the acid in an aqueous solution of the acid ether or by igniting the dry sodium salt and determining the sodium content of the ignition residue.

Normally, different types of catgut sutures are used— some of which resorb in the tissues in about 4–5 days' time and some requiring up to 40 days or even longer. (It must be pointed out, however, that resorption times are subject to some variation and sometimes residues of catgut remain in the tissues for considerable periods— see H. P. Jenkins, Archives of Surgery, vol. 44, p. 881, May 1942; vol. 45, p. 74, July 1942.) The tendency is for surgeons to use very small diameter sutures, in which case these residues can be very small—but this makes high and uniform strength very important. These types of catgut range from plain, untreated, heat-sterilized catgut to lightly, moderately or heavily chrome-tanned material. My methods also provide for control of resorption rate, as shown below.

This invention will be described in terms of the use of cellulose glycolic acid ether compounds (called "cgae") although it will be understood that other cellulose acid ethers as enumerated above can be substituted in whole or in part. The cgae compounds here used are characterized by a DS of from 0.5 to 2.5, preferably 0.7 to 1.5, and by a DP as indicated by aqueous solution viscosities of their sodium salts at 25° C. as follows: 25 centipoises for a 2 weight percent solution to 1500 centipoises for a 1 weight percent solution and preferably 50 cps. for a 2% and 1200 cps. for a 1% solution. Thus, a given sample in 2% solution must not have a viscosity below the limit of 25 cps. or above the limit of 1500 cps. in 1% solution. (Viscosities determined with a Brookfield Viscometer, Model LVF, using Spindle #2 at 30 r.p.m. and #3 at 30 r.p.m. for low, medium and high viscosities, respectively.) Cgae with DP outside the specified range yields sutures of unsatisfactory resorption characteristics; with a DP below the range, the resorption is too rapid and with DP above the range, the resorption is too slow and incomplete.

When an aqueous solution of the above specified cgae is heated or dried to less than about 14 weight percent moisture (as determined by the Karl Fischer method—U.S. Pharmacopeia, 16th revision, 1960, p. 939, published by Mack Printing Co., Easton, Pa.), the cgae is converted into a form that is no longer rapidly dissolved in water or animal tissue fluids, which is considered to be due to the formation of lactones by reaction of the acid groups with the residual hydroxyl groups. Such products are, however, slowly soluble (resorbable) in animal tissue over a period of days or weeks providing they are within the DP (viscosity) range specified above. Material thus made from cgae at the lower end of the range is resorbed in a few days while that at the higher end requires several weeks and material of intermediate DP resorbs in intermediate times. Of course there are some differences in resorption time because, for reasons of economy, the cgae used is usually a mixture of compounds of somewhat different DS and DP and the points of substitution of the acid groups may be in different positions in the different chains, so that preliminary tests of a batch of cgae can be made in order to more closely determine and/or adjust the properties of the product by adding lower or higher DP material as may be required. More homogeneous cellulose acid ether mixtures can be made by fractionating aqueous solutions of them or of their sodium salts by successive additions of ethyl or isopropyl alcohol, which results in precipitating the more viscous (longer chain length or higher molecular weight) material before that of shorter chain length.

Strands of approximately circular cross-section as required for suture use, are made by forcing viscous solutions through small orifice, either single or multiple (spinnerettes). For example, an aqueous solution of CMC is forced through an orifice of about 3 to 4 mils diameter, into a solution of 80% isopropyl alcohol containing 20% concentrated aqueous HCl (36% HCl). The strand is stretched as it emerges from the orifice to orient the chains lengthwise of the strand and the resulting stretched and narrowed strand of cgae is washed with water to remove HCl and NaCl. Such a strand is still too stretchable for use as a suture and it then must be stretched just below its limit of stretchability and heated to from 40 to 100° C. in the stretched condition to "relax" it, to shrink and cross-bond the chains, to further orient the chains and thus obtain a largely unstretchable and strong strand. Sutures of very fine sizes (up to 1 to 2.5 mils diameter, a 7–0 suture) may be of a single strand but the larger sizes (up to 26.5 to 30 mils, a No. 3 suture) are made up of several fine strands twisted or braided together. Large diameter single strands (monofilaments) are impractical because (1) too long a time is required for the treating solutions to diffuse completely through from outside to center (2) a large diameter monofilament is less flexible and holds a surgeon's knot less well (3) small diameter strands have greater tensile strength per unit cross-section. For these reasons, therefore, the filament diameter should not be greater than about 10 mils, and preferably not over about 5 mils.

Another method is to extrude a viscous aqueous solution of cgae (made, for example, by contacting an aqueous solution of CMC with a cation exchange resin in the acid form and vacuum evaporating the solution) into an alcohol-water solution containing about 80% ethyl or isopropyl alcohol. Still another method is to extrude a viscous solution of CMC into a solution of cadmium or copper nitrate. This precipitates the insoluble cadmium or copper salt and further results in orientation of the chains due to diffusion of the Cd or Cu ions through the outer film of the strand, giving rise to diffusion- and membrane-potentials which act upon the polar groups to form parallel layers of oriented material. (See Der Mathematische und Naturwissenschaftliche Unterricht, 16 Band, Heft 4, Sept. 1, 1963, pp. 145–148; Ferd. Dummlers Verlag, West Germany.) The strand is then treated with aqueous alcohol-HCl solution to replace the Cd or Cu ions by hydrogen ions from the acid. The resulting strand of cgae is then washed and heated under tension as above to dry, shrink, tightly cross bond the chains and reduce its stretchability.

Strands of suture material may also be made by twisting a single or twisting or braiding together multiple narrow strips of thin film which have been stretched to orient the chains in the lengthwise direction of the strips. Thin films are made by (1) evaporation of an aqueous solution of cgae (2) evaporation of an aqueous solution of CMC and treating the film with a solution of cadmium or copper nitrate and then with aqueous-alcoholic HCl as above (3) by treating a film of CMC with aqueous-alcoholic HCl as above. The washed films of cgae are then stretched to orient the chains in the lengthwise direction, twisted and dried and heated under tension as above. The twisted or braided, stretched, dried and heated strands are usable as is or they may be bonded to prevent fraying at the areas of film contact by impregnating on the surface at least, with a solution of cgae, followed by drying.

Following are examples of the present invention, which are given merely as illustrative, it being understood that variations and modifications within the scope of the invention may be made by those skilled in the art.

EXAMPLE 1

A 2% aqueous solution of CMC 0.9 DS and 35 cps. viscosity at 25° C., was converted to a solution of cgae by passing it slowly through a column of cation exchange resin in the acid form (IR–120, made by Rohm and Haas Co., Philadelphia, Pa., washed with dilute aqueous HCl followed by distilled water). Part of this solution was poured on a glass plate and allowed to dry at room temperature, forming a thin film. A narrow strip of this film was stretched and then twisted into a strand and heated under tension at 60° C. for 2 hours. It formed a strand of about circular cross-section and about 4 mils in diameter. It had lost its stretchability and had a tensile strength of 0.45 pound as against about 0.5 lb. for a similar strand of surgical gut. A surgeon's knot held well. It was sterilized by formaldehyde and resorbed in the abdominal muscle of a rabbit in about 6 days.

EXAMPLE 2

A cgae solution like that of Example 1 was vacuum evaporated until it became very viscous. This solution was forced through a small orifice into a solution of 80% isopropyl alcohol and 20% water. The strand was stretched as it was extruded and was then heated under tension at 60° C. for 3 hours. It formed a strand 2 mils in diameter with a tensile strength of 0.15 lb. as compared with a strength of 0.18 for a similar strand of surgical gut. The strand had lost its stretchability, held a knot well and resorbed in animal tissue in about 5 days. Ethyl, isopropyl and propyl alcohols are roughly equivalent in this and other similar procedures. These alcohols are designated "lower alcohols."

EXAMPLE 3

A 1.5% aqueous solution of CMC of 1.2 DS and having a viscosity of 1200 cps. in 1% solution at 25° C., was forced through a small orifice into a 1 normal solution of cadmium nitrate and slowly drawn through the solution while being stretched. The strand was then soaked for 5 hours in 0.02 N aqueous HCl and then washed in water until all salts and HCl were removed. The strand was then heated under tension at 50 to 70° C. It measured 3 mils in diameter and had a strength of 0.5 lb. as against a strength of 0.4 lb. for a similar strand of catgut. The strand had little stretchability and held a knot well. It resorbed in animal tissue in about 25 days.

EXAMPLE 4

A permeable cellophane dialysis tube closed at the bottom end and containing 1 N cadmium nitrate solution was immersed into a 4% aqueous solution of CMC of 0.9 DS and 400 cps. viscosity in 2% solution at 25° C. As the cadmium ions diffused through the cellophane, a film was formed on its outer surface overnight. The tube was removed from the CMC solution, the cadmium nitrate solution removed and the film washed with 50% aqueous ethyl alcohol and then immersed in a solution of 80% ethyl alcohol and 20% concentrated 36% HCl (36% HCl) and finally washed with 95% aqueous ethyl alcohol until salts and acid were removed. The film was then stripped from the cellophane, slit and twisted into a strand and heated under tension. It had a tensile strength of 0.55 lb. as compared to 0.5 lb. for a similar strand of catgut of the same diameter (4 mils). It held a knot well, was not largely stretchable and resorbed in animal tissue in about 20 days. (It should be noted that in the case of thin films, as noted above for strands, the thickness of the film should not be over about 10 mils, and preferably not over about 5 mils for similar reasons.)

What is claimed is:

1. A method of making a resorbable suture material which comprises in succession the steps of: (1) forming a strand by twisting and applying tension to a narrow, stretched strip of film of at least one cellulose acid ether selected from the class consisting of cellulose glycolic acid ether, cellulose hydroxy propionic acid ether, hydroxy ethyl cellulose glycolic acid ether, cellulose glycolic acid and cellulose hydroxy propionic acid ether in which up to one-half the remaining hydroxyl groups from the anhydroglucose units of the cellulose are substituted by lower alkoxy groups, and mixtures thereof; said acid ether being characterized by a degree of substitution of between 0.5 and 2.0 and by a degree of polymerization such that a 2 percent aqueous solution of its sodium salt has a viscosity not less than about 25 centipoises and a 1 percent solution of its sodium salt has a viscosity not over about 1500 centipoises at 25° C.; (2) drying the said strand from step (1) under tension until its moisture content is below about 14 percent and it has achieved relative insolubility in water; and (3) stretching the product of step (2) just below its limit of extensibility and heating it in the stretched condition at a temperature between 40° C. and 100° C. to cause substantial relaxation and loss of its stretchability.

2. The method of claim 1 wherein the said viscosity of said cellulose acid ether sodium salt is not below about 50 centipoises in 2 percent solution and not above about 1200 centipoises in 1 percent solution at 25° C.

3. The method of claim 1 wherein the said strand of said step (1) is formed by forcing a viscous solution of said cellulose acid ether through a small orifice into an aqueous lower alcohol solution in which said cellulose acid ether is not soluble and stretching said strand while it is being formed.

4. The method of claim 3 wherein the said viscosity of sail cellulose acid ether sodium salt is not below about 50 centipoises in 2 percent solution and not above about 1200 centipoises in 1 percent solution.

5. A method of making a resorbable surgical suture material which comprises in succession the steps of; (1) diffusing the cations of a solution selected from the class consisting of cadmium salts and copper salts, through a semi-permeable membrane into a viscous solution of the sodium salt of at least one cellulose acid ether selected from the class consisting of cellulose glycolic acid ether, cellulose hydroxy propionic acid ether, hydroxy ethyl cellulose glycolic acid ether, cellulose glycolic acid and cellulose hydroxy propionic acid ether in which up to one-half the remaining hydroxyl groups from the anhydro-glucose units of the cellulose are substituted by lower alkoxy groups, and mixtures thereof; said acid ether being characterized by a degree of substitution of between 0.5 and 2.0 and by a degree of polymerization such that a 2 percent aqueous solution of its sodium salt has a viscosity not less than about 25 centipoises and a 1 percent solution not over about 1500 centipoises at 25° C.; (2) removing said membrane from said salts, washing the film deposited on said membrane from said sodium salt solution and treating said film with an aqueous lower alcohol solution of HCl and then washing said film; (3) stripping said film from said membrane and twisting said film under tension to form a strand and heating and drying said strand under tension.

6. The method of claim 5 wherein the said selected sodium salt is the sodium salt of cellulose glycolic acid ether.

7. The method of claim 6 wherein the said acid ether is characterized by a degree of substitution of between 0.7 and 1.5 and by a degree of polymerization such that a 2 percent solution of its sodium salt has a viscosity not less than 50 centipoises and a 1 percent solution not over 1200 centipoises at 25° C.

8. A method of making a resorbable surgical suture material which comprises in succession the steps of: (1) extruding through a small orifice into a solution selected from the class consisting of cadmium and copper salts, a viscous solution of the sodium salt of at least one cellulose acid ether selected from the class consisting of cellulose glycollic acid ether, cellulose hydroxy propionic acid ether, hydroxy ethyl cellulose glycolic acid ether, cellulose glycolic acid and cellulose hydroxy propionic acid ether in which up to one-half the remaining hydroxyl groups from the anhydroglucose units of the cellulose are substituted by lower alkoxy groups, and mixtures thereof; said acid ether being characterized by a degree of substitution of between 0.5 and 2.0 and by a degree of polymerization such that a 2 percent aqueous solution of its sodium salt has a viscosity not less than 25 centipoises and a 1 percent solution not over 1500 centipoises at 25° C.; (2) washing the product of step (1), treating it with a dilute aqueous solution of a strong acid and then washing the acid therefrom (3) stretching, drying and heating under tension the product of step (2).

9. The method of claim 8 wherein the said selected cellulose acid ether sodium salt is cellulose glycolic acid ether sodium salt.

10. The method of claim 9 wherein the said degree of substitution is between 0.7 and 1.5 and the said degree of polymerization is such that the viscosity of a 2 percent aqueous solution of said sodium salt is not less than about 50 centipoises and of a 1 percent solution is not above about 1200 centipoises at 25° C.

11. A surgical suture resorbable in living animal tissue, having a tensile strength of at least 75% of that of a similar catgut suture comprising a strand of at least one cellulose acid ether selected from the class consisting of cellulose glycolic acid ether, cellulose hydroxy propionic acid ether, hydroxy ethyl cellulose glycolic acid ether, cellulose glycolic acid ethers and cellulose hydroxy propionic acid ethers in which up to one-half the remaining hydroxyl groups of the anhydroglucose units from the cellulose are substituted by lower alkoxy groups, and mixtures thereof; said cellulose acid ether being characterized by a degree of substitution of between 0.5 and 2.0 and a degree of polymerization such that a 2 percent aqueous solution of its sodium salt has a viscosity of not less than about 25 centipoises and a 1 percent solution not over about 1500 centipoises at 25° C.; and said strand being further characterized by relative insolubility in water and relative inextensibility.

12. The product of claim 11 wherein the said strand is comprised of a film twisted under tension.

13. The product of claim 11 wherein the said cellulose acid ether selected is cellulose glycolic acid ether.

14. The product of claim 12 wherein the said cellulose acid ether selected is cellulose glycolic acid ether.

15. The product of claim 13 wherein the said cellulose glycolic acid ether has a degree of substitution of between 0.7 and 1.5 and a degree of polymerization such that the viscosity of a 2 percent aqueous solution of its sodium salt is not less than about 50 centipoises and of a 1 percent solution is not over about 1200 centipoises at 25° C.

16. The product of claim 14 wherein the cellulose glycolic acid ether has a degree of substitution between about 0.7 and 1.5 and a degree of polymerization such that the viscosity of a 2 percent aqueous solution of its sodium salt it not below about 50 centipoises and of a 1 percent solution is not over about 1200 centipoises at 25° C.

17. A method of making a resorbable surgical suture material which comprises in succession the steps of: (1) contacting a dried thin film of the sodium salt of cellulose glycolic acid ether of a degree of substitution between 0.5 and 2.5 and whose sodium salt in 2 weight percent aqueous solution at 25° C., has a viscosity of not less than 50 centipoises and in 1 weight percent solution not over 1200 centipoises with an aqueous lower alcohol solution of HCl containing sufficient alcohol so that said sodium salt is not dissolved; (2) washing the product of step (1) with aqueous lower alcohol solution containing sufficient alcohol so that the said product is not dissolved; (3) twisting the product of step (2) in the form of a thin, narrow stretched strip into a strand and heating and drying the strand under tension.

18. A method of making a resorbable surgical suture material which comprises in succession the steps of: (1) contacting a dried thin film of the sodium salt of cellulose glycolic acid ether of a degree of substitution between 0.5 and 2.5 and whose sodium salt in 2 weight percent solution at 25° C., has a viscosity of not less than 50 centipoises and in 1 weight percent solution not over 1200 centipoises with an aqueous lower alcohol solution of a material selected from the class consisting of cadmium salts and copper salts containing sufficient alcohol so that said sodium salt is not dissolved; (2) washing the product of step (1) and contacting it with an aqueous lower alcohol solution of HCl containing sufficient alcohol so that the resulting product is not dissolved; (3) washing and stretching the product of step (2) and twisting it into a strand under tension and drying and heating the stretched strand under tension.

19. A surgical suture which comprises at least one long, thin strand of at least one cellulose acid ether selected from the class consisting of cellulose glycoic acid ether, cellulose hydroxy-propionic acid ether, hydroxyethyl cellulose glycolic acid ether, cellulose glycolic acid and cellulose hydroxypropionic acid ether in which up to one-half the remaining hydroxyl groups from the anhydroglucose units of the cellulose are substituted by lower alkoxy groups and mixtures thereof; said acid ether being characterized by a degree of substitution of between 0.5 and 2 and by a degree of polymerization such that a 2 weight percent aqueous solution of its sodium salt has a viscosity not less than 50 centipoises and a 1 weight percent aqueous solution of its sodium salt has a viscosity not over 1200 centipoises at 25° C.; said acid ether molecules being longitudinally oriented by diffusion into them of cations forming insoluble salts therewith and selected from the class consisting of copper and cadmium, thereby giving rise to molecular-chain-orienting diffusion- and membrane-potentials as diffusion of ions into said strand occurs and said cations having been subsequently replaced by the hydrogen ions of a strong acid and said strand having been finally washed to remove free ions and then dried and heated under tension in its longitudinal direction to insolubilize it and reduce its stretchability.

20. The product of claim 19 wherein said strand is comprised of at least one, long, narrow, thin, twisted film.

References Cited
UNITED STATES PATENTS

| | | | |
|---|---|---|---|
| 2,445,374 | 7/1948 | Van Wyck | 106—197 X |
| 2,495,767 | 1/1950 | Reid et al. | 106—197 X |
| 2,773,027 | 12/1956 | Powers | 210—8.5 |
| 3,297,033 | 1/1967 | Schmitt et al. | 128—335.5 |

DALTON L. TRULUCK, Primary Examiner

U.S. Cl. X.R.

106—197

UNITED STATES PATENT OFFICE
CERTIFICATE OF CORRECTION

Patent No. 3,499,449                                                  March 10, 1970

David F. Smith

It is certified that error appears in the above identified patent and that said Letters Patent are hereby corrected as shown below:

Column 2, line 13, "ion" should read -- ions --. Column 5, line 19, cancel "36%", first occurrence. Column 8, line 10, "glycoic" should read -- glycolic --; same column 8, after line 42, insert

| | | | |
|---|---|---|---|
| 2,748,774 | 6/1956 | Novak | 128-335.5 |
| 2,764,159 | 9/1956 | Masci | 128-335.5 |
| 2,972,178 | 2/1961 | Hiler | 128-335.5 |
| 3,114,591 | 12/1963 | Nichols et al | 128-335.5 |

Signed and sealed this 8th day of December 1970.

(SEAL)
Attest:

EDWARD M. FLETCHER, JR.
Attesting Officer

WILLIAM E. SCHUYLER, JR.
Commissioner of Patents